United States Patent [19]

Wescott

[11] 4,211,461

[45] Jul. 8, 1980

[54] AXIALLY MATING CABLE CONNECTOR

[75] Inventor: Ronald O. Wescott, Edison, N.J.

[73] Assignee: Industrial Electronic Hardware Corp., New York, N.Y.

[21] Appl. No.: 963,927

[22] Filed: Nov. 27, 1978

[51] Int. Cl.[3] ........................ H01R 13/62; F16L 19/00

[52] U.S. Cl. .................................... 339/91 R; 285/362

[58] Field of Search .................... 339/91 R, 74 R, 211, 339/184 M, 60 M, 60 R, 59 R, 59 M, 94 R, 89 M; 285/331, 319, DIG. 22, 362, 377

[56] References Cited

U.S. PATENT DOCUMENTS

| | | | |
|---|---|---|---|
| 517,192 | 3/1894 | Prior | 285/319 X |
| 2,274,798 | 3/1942 | Kostal | 339/74 R |
| 3,184,703 | 5/1965 | Piscitello | 339/60 R X |
| 3,252,124 | 5/1966 | Hansen | 339/184 M X |
| 3,588,149 | 6/1971 | Demler | 285/331 X |
| 3,880,487 | 4/1975 | Goodman | 339/91 R X |

*Primary Examiner*—Neil Abrams
*Assistant Examiner*—John S. Brown
*Attorney, Agent, or Firm*—James & Franklin

[57] ABSTRACT

The connector includes first and second axially mating parts carrying interengageable contact members. A pair of spaced flexible locking arms axially extend from the first part. Each arm includes a body portion and a locking portion, the latter having a pair of laterally extending lobes. The second part has a pair of axially extending recesses terminating in a circumferential groove in which a sleeve is rotatably mounted. The sleeve has circumferential recesses each including a nesting section and a camming section. The sleeve is biased to normally align the nesting sections with the respective axially extending recesses. To lock the parts, the body portions of arms are received in the respective axially extending recesses with the locking portions thereof situated in the respective nesting sections such that radially extending shoulders at either side of the axially extending recesses engage the lobes. To release the locking mechanism, the sleeve is rotated against the force of the spring to cause the camming sections to move the locking portions radially outwardly to disengage the lobes from the shoulders to permit separation of the parts.

9 Claims, 5 Drawing Figures

FIG. 2
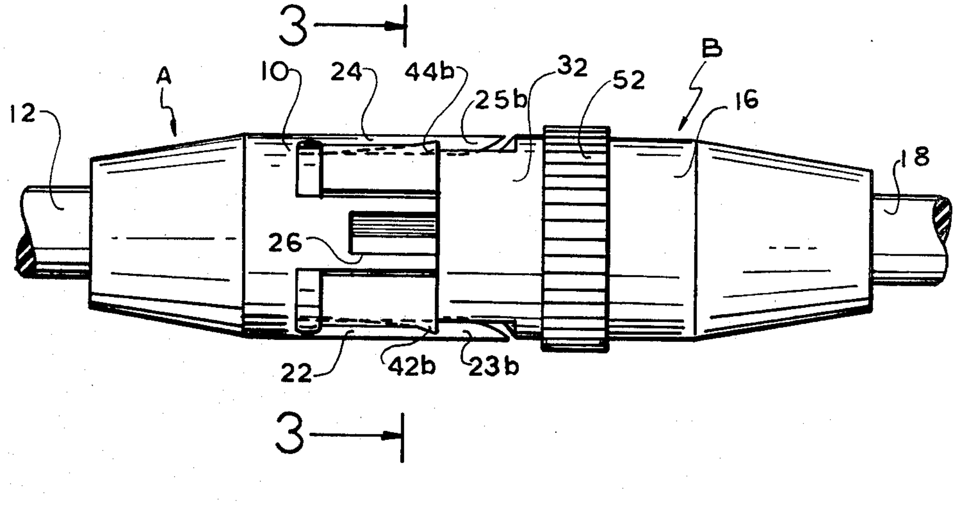
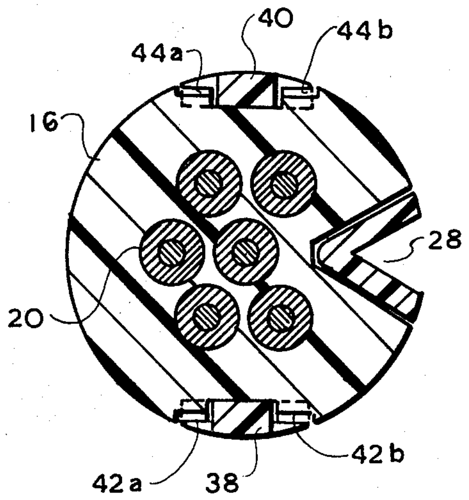
FIG. 3

AXIALLY MATING CABLE CONNECTOR

The present invention relates to a cable connector and, more particularly, to an axially mating cable connector with exterior locking and rotatable release mechanisms of simplified design.

A cable connector is a device which includes two parts, each of which is connected to the end of a cable. Each part has a housing and a plurality of electrically isolated contact members, each of which is electrically connected to one of the wires of the cable to which the part is mounted. The parts are designed to mate in a manner which causes the contact members of one part to engage the corresponding contact members of the other part to electrically connect the cables.

Cable connectors are often provided with a mechanism to lock the parts together to prevent unwanted disconnection of the cables. In many connectors, the design of the locking mechanism requires a secondary motion on the part of the operator to actuate same. Thus, for connection of the parts, two separate motions are necessary, one motion to push the parts together to engage the contacts, and a separate motion to actuate the locking mechanism. It is, of course, preferable to eliminate the necessity of the secondary motion to actuate the locking mechanism, such that the locking mechanism will be automatically actuated to lock the parts when the parts are pushed together to cause interengagement between the contacts. In this manner, connection and locking of the parts is achieved by simply pushing the parts together, resulting in an easy and quick connection.

When a locking mechanism is provided to prevent separation of the parts, a mechanism to release the locking mechanism to permit disconnection of the parts is also required. It is desirable to have the release mechanism function as simply and reliably as possible such that a single simple movement on the part of the operator will permit disconnection of the parts.

In certain applications, only a limited space is provided for the connector. Thus, it is necessary that the locking mechanism and release mechanism be as compact as possible. Complicated locking and release mechanisms, comprising a large number of moving parts, are, therefore, unsuitable.

In many conventional axially mating cable connectors, the locking mechanism and at least a portion of the release mechanism are located within the housings of the parts and are thus not accessible from the exterior of the connector when the parts are connected. Further, the actuator portion of the release mechanism, which is accessible from the exterior of the connected parts, is designed to move axially to cause the internal portion of the release mechanism to release the locking mechanism. This structural configuration is undesirable for two reasons.

The first reason relates to the fact that if the locking mechanism becomes jammed in the locked position, or the internal portion of the release mechanism becomes jammed, the parts cannot be manually disconnected because manipulation of the locking mechanism is prevented as same is situated within the part housings and, thus, is not accessible. Thus, the connector must be severed from the cables and replaced with a new connector. The jamming of the locking mechanism and/or the release mechanism may occur simply because a foreign substance, such as a piece of dirt or the like, is situated within the mechanism. However, if same were externally accessible, even when the parts are connected, the parts could be disconnected and the foreign substance removed, thus eliminating the necessity for replacing the connector.

The second reason relates to the direction of movement which the actuator of the release mechanism must be moved to release the locking mechanism. The release mechanism actuator is designed to be moved axially with respect to the part upon which same is mounted. As a result, accidental actuation of the release mechanism may occur if the actuator thereof is held stationary, in the operator's hand or in engagement with an external object, as the cable connected to the connector is pulled, causing the release mechanism actuator to move axially with respect to the remainder of the connector housing.

It is, therefore, a prime object of the present invention to provide an axially mating cable connector wherein connection and locking of the parts is achieved by a single motion on the part of the operator.

it is a second object of the present invention to provide an axially mating cable connector wherein the locking mechanism is compact in nature, thereby adding only a small amount of additional volume to the connector.

It is a third object of the present invention to provide an axially mating cable connector wherein the release mechanism is actuated by a single simple motion on the part of the operator.

It is a fourth object of the present invention to provide an axially mating cable connector wherein the release mechanism is compact in nature, thereby adding only a small amount of additional volume to the connector.

It is a fifth object of the present invention to provide an axially mating cable connector wherein the locking mechanism and releasing mechanism are situated externally of the connector housing, such that same are accessible even when the parts are connected.

It is another object of the present invention to provide an axially mating cable connector wherein the actuator portion of the release mechanism is rotated relative to the connector housing to actuate the release mechanism, such that the possibility of accidental disconnection of the connector is substantially reduced.

It is a further object of the present invention to provide an axially mating cable connector having a locking mechanism of simplified design which functions reliably to maintain connection between the parts.

It is still another object of the present invention to provide an axially mating cable connector having a release mechanism of simplified design which functions reliably to release the locking mechanism when same is actuated.

It is a still further object of the present invention to provide an axially mating cable connector which can be inexpensively manufactured, due to the simplicity of the construction of the parts thereof.

In accordance with the present invention, an axially mating cable connector is provided having first and second parts carrying interchangeable contact members. Means are provided for locking the parts to prevent disengagement of the contact members. Means are provided for releasing the locking means to permit disengagement of the contact members. The locking means includes a flexible locking arm mounted on and axially extending from the exterior surface of the first part. The arm has a lobe thereon. A shoulder is provided on the exterior surface of the second part. The arm is adapted to be received adjacent a portion of the exterior surface of the second part with the lobe in engagement with the shoulder to lock the parts. The releasing means comprises a member mounted on the second part and rotatable about the axis thereof to engage the arm and move same radially outwardly of the exterior surface of the second part to disengage the lobe from the shoulder.

A circumferential groove is provided on the exterior surface of the second part into which an actuator member is at least partially received. The radially extending wall of the groove forms the shoulder which engages the lobe. The arm has a body portion and a locking portion. The lobe laterally extends from the locking portion. The exterior surface of the second part has an axially extending recess into which at least a portion of the body portion of the arm is adapted to be received. The axially extending recess terminates at the groove wall such that the locking portion extends past the wall into the groove such that the lobe engages the shoulder.

The actuator member has a circumferentially extending recess comprising a nesting section and a camming section. The member is rotatable between a first position wherein the lobe is situated in the nesting section, and a second position wherein the camming section engages the locking portion and moves same radially outwardly of the exterior surface of the second part. A biasing spring, located within the groove under the actuator member, applies a force on the actuator member, tending to cause same to rotate to the first position.

Preferably, the locking means comprises a pair of flexible locking arms, each having a pair of laterally extending lobes thereon. The arms extend axially from the exterior surface of the first part and are spaced apart such that the second part is received therebetween. The exterior surface of the second part is provided with a pair of axially extending recesses, each terminating in the groove wall, to provide a pair of shoulders to engage the lobes on each of the locking arms, when the parts are connected.

Each of the axially extending recesses is defined by inclined walls which cooperate with the locking portion to move same radially outwardly of the exterior surface of the second part, as the parts are moved together, such that engagement between the lobes and the shoulders is facilitated.

As an optional feature, means may be provided for biasing the parts away from each other, such that the parts automatically separate after the locking mechanism has been released. This biasing means preferably comprises a compressible element interposed between the parts. The element has an opening therein such that it does not interfere with the interengagement of the contact members.

To these and such other objects as may hereinafter appear, the present invention relates to an axially mating cable connector—as described in the following specification and recited in the annexed claims, wherein like numerals refer to like parts and in which:

FIG. 2 is a side elevational view of the axially mating cable connector of the present invention;

FIG. 3 is a front view of one of the parts of the axially mating cable connector of the present invention, taken along line 3—3 of FIG. 2;

Figure 1:
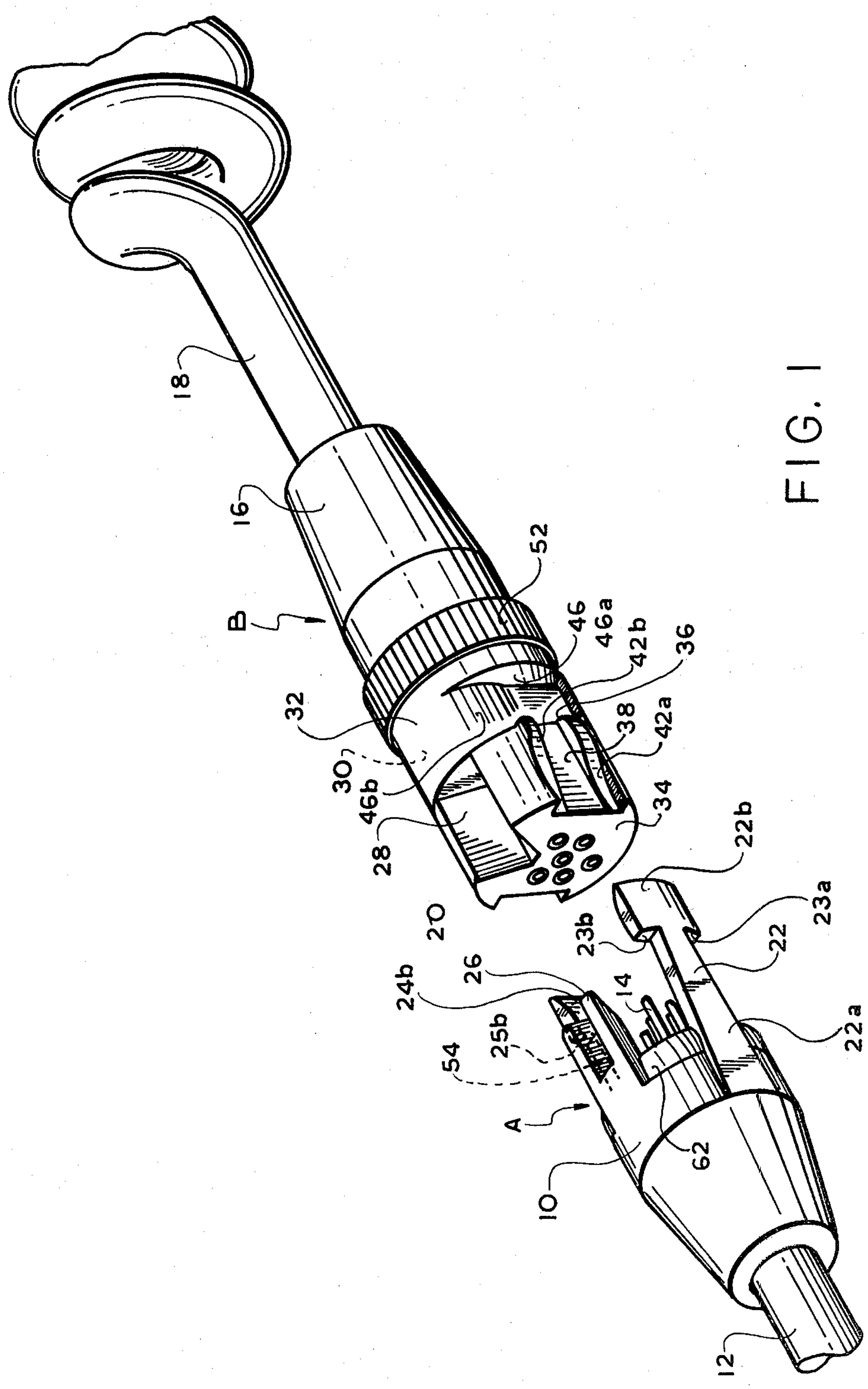
FIG. 1 is an exploded isometric view of the axially mating cable connector of the present invention.

The axially mating cable connector of the present invention comprises two axially mating parts, generally designated A and B, respectively. Part A comprises a generally cylindrical housing 10, composed of molded plastic or the like, mounted on the end of a multi-strand cable 12. Axially extending from the forward surface of housing 10 are a plurality of parallelly aligned contact members, in the form of pins 14. Each of the pins 14 is electrically connected to a different one of the strands of wire within cable 12. Pins 14 are electrically isolated from each other by housing 10, which is composed of electrically non-conducting material.

Part B is composed of a generally cylindrical housing 16, also formed of molded plastic or the like. Housing 16 is mounted on the end of a multi-strand cable 18. The forward surface of housing 16 is provided with a plurality of contact members, in the form of pin receptacles 20. A different pin receptacle 20 is provided for each of the pins 14 extending from housing 10. When parts A and B are in the correct rotational position with respect to each other, each of the contact receptacles 20 aligns with the corresponding pin 14 such that when the parts are connected, pins 14 operatively interengage the corresponding pin receptacles 20 so as to provide electrical connection between each of the strands in cable 12 and the corresponding strands in cable 18.

Part A is provided with a pair of locking arms 22, 24 which extend axially towards part B from diametrically opposed portions of the exterior surface of housing 10. When part B is moved adjacent part A, to interengage contact members 14 and 20, the forward portion of housing 16 is received between locking arms 22 and 24. Locking arms 22 and 24 cooperate with structure on housing 16 so as to lock parts A and B together to prevent disengagement of the contact members 14 and 20.

Also extending from housing 10 of part A, in an axial direction, is a V-shaped rotational positioning member 26 which, when parts A and B are in the correct relative rotational position to align contact members 14 and 20, is adapted to be received within a V-shaped groove 28 on housing 16. Member 26 and groove 28 cooperate in such a manner as to prevent connection of parts A and B, unless same are properly relatively rotationally positioned such that the correct contact members 14 align with the corresponding contact members 20.

Housing 16 is provided with a circumferential groove 30 (best seen in FIGS. 4 and 5) into which an actuator member, in the form of a sleeve 32, is rotationally received. Axially extending along the exterior surface of housing 16, from the forward surface 34 thereof to the radially extending forward wall 36 of groove 30, are a pair of recesses 38, 40 circumferentially positioned to align with locking arms 22, 24, respectively, when member 26 aligns with groove 28. The relative positions between recesses 38 and 40, groove 28 and contact members 20, can best be appreciated from FIG. 3. Each of the recesses 38, 40 is defined between a pair of inclined surfaces **42*a*, 42*b* and 44*a*, 44*b***, respectively.

Locking arms 22, 24 are composed of flexible material such that same may move radially outwardly to a sufficient extent to permit the forward portion of housing 16 to be received therebetween. Each of the flexible locking arms 22, 24 consists of a body portion 22a, 24a, respectively, and a locking portion 22b, 24b, respectively. Each of the body portions 22a, 24a is tapered slightly along its length with the narrowest portion being adjacent the locking portion 22b, 24b at the end thereof. Each of the locking portions 22b and 24b comprises a pair of lobes 23a, 23b and 25a, 25b, respectively, extending laterally outwardly of the periphery of the body portion 22a, 24a, to which same are respectively mounted, so as to form a "T"-shape therewith. The exterior surface of each of the locking portions 22b, 24b is preferably formed with a curved configuration so as to match the curvature of the exterior surface of housing 10 from which each of the locking arms 22, 24 extend. In this manner, when parts A and B are connected, the connector appears to have a substantially cylindrical shape.

The inclined surfaces 42a, 42b and 44a, 44b which define recesses 38 and 40, respectively, are inclined outwardly from the axis of housing 16 along the length of the respective recesses, such that a pair of radially extending shoulders are provided at either side of each recess at the intersection of each of the inclined surfaces and the radially extending forward wall of circumferential groove 30.

Figure 4:
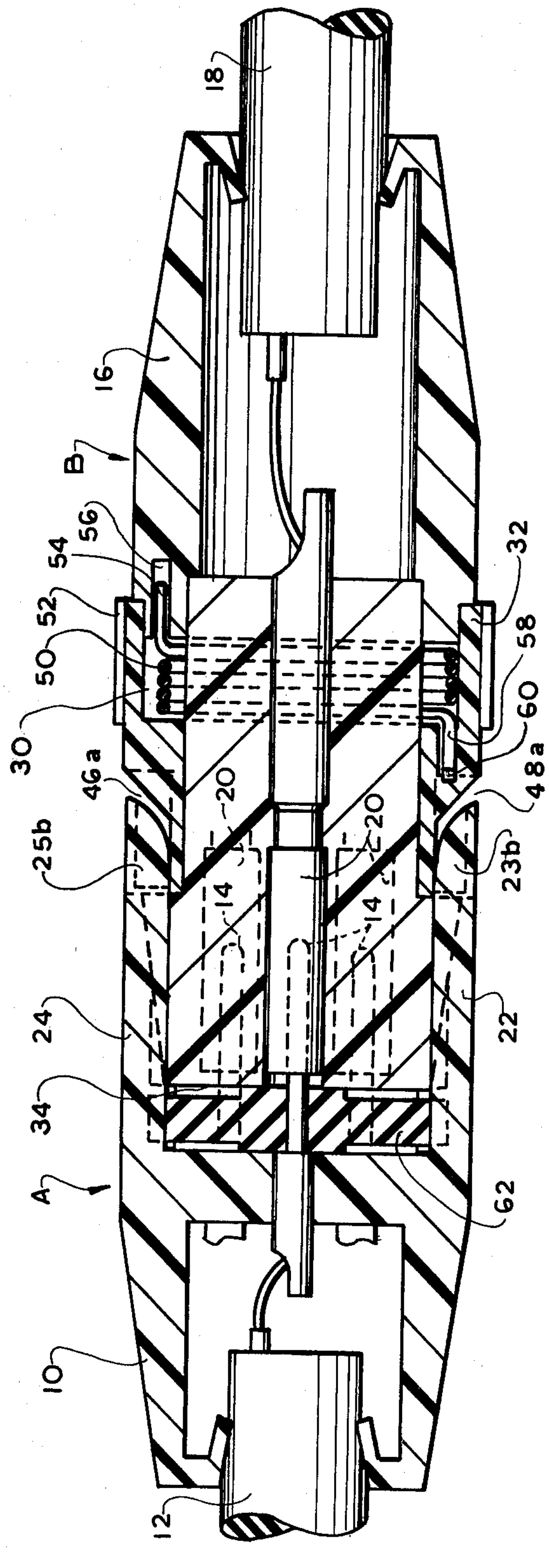
FIG. 4 is a cross-sectional view of the axially mating cable connector of the present invention, wherein the actuator member thereof is in the locked position.

When parts A and B are correctly rotationally positioned, such that element 26 is aligned with groove 28, flexible locking arms 22, 24 are aligned with axially extending recesses 38 and 40, respectively. In this rotational position, as the parts are moved together, the laterally extending lobe portions 23a, 23b and 25a, 25b of each of the locking portions 22b, 24b of flexible locking arms 22, 24, respectively, engage inclined surfaces 42a, 42b and 44a, 44b, respectively, and are guided thereby over the shoulders formed at either side of each of the recesses 38 and 40. Thus, inclined surfaces 42a, 42b and 44a, 44b provide a camming action to cause the locking portions 22b and 24b of each of the locking arms 22 and 24, respectively, to be moved radially outwardly with respect to the exterior surface of housing 16 so as to pass over the shoulders. When this happens, the body portions 22a and 24a snap into the respective recesses 38 and 40, and the laterally extending lobe portions 23a, 23b and 25a, 25b engage the shoulders on either side of the recesses 38, 40, respectively, to maintain engagement between contact members 14 and 20 and prevent the parts A and B from separating. This state is shown in FIGS. 2 and 4.

Sleeve 32 has a pair of circumferentially extending recesses 46, 48 thereon. Each of the recesses 46, 48 are provided with a nesting section 46a, 48a, respectively, and a camming section 46b, 48b, respectively, Recesses 46 and 48 are situated in diametrically opposed positions along the surface of sleeve 32 such that same align with the axially extending recesses 38 and 40, respectively.

Figure 5:
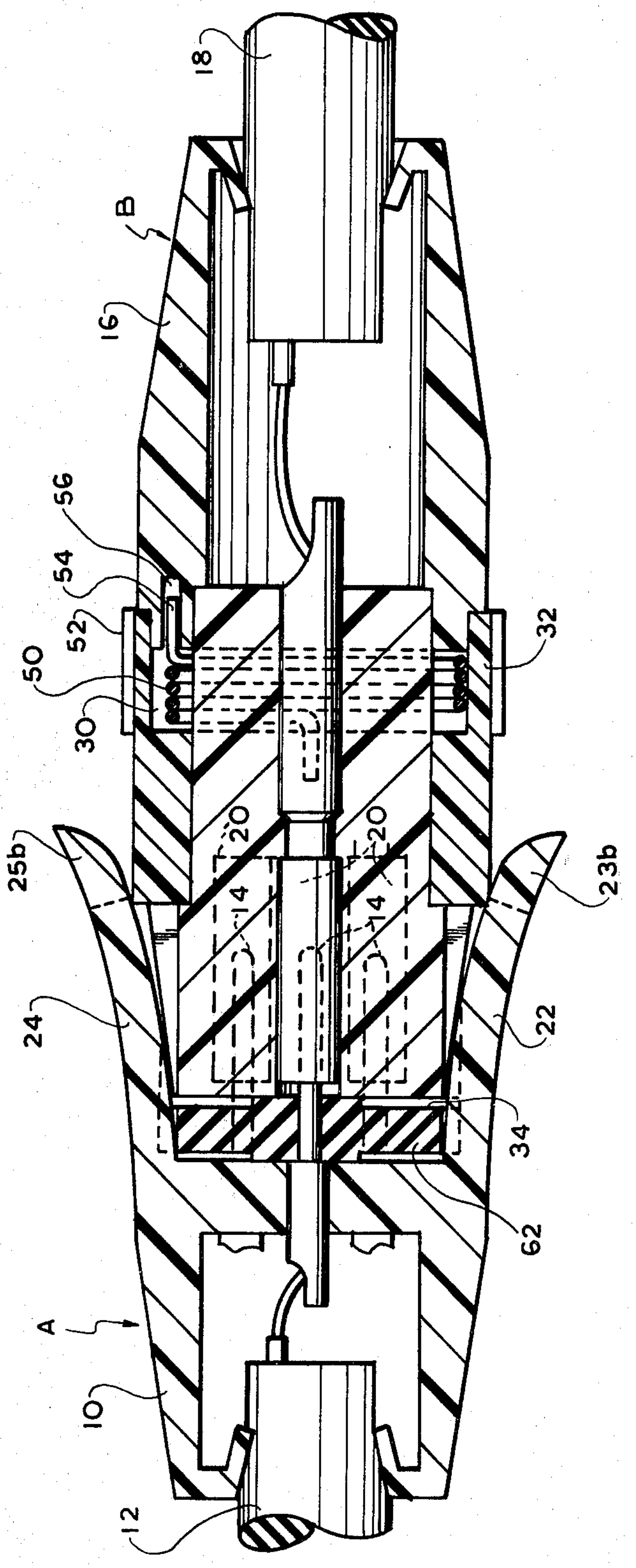
FIG. 5 is a cross-sectional view showing the axially mating cable connector of the present invention, with the actuator member thereof in the release position.

Sleeve 32 is rotatable between a first position, wherein each of the nesting sections 46a, 48a of recesses 46, 48 are aligned with the respective axially extending recesses 38 and 40, and a second position wherein the camming sections 46b, 48b of recesses 46 and 48 are aligned with axially extending recesses 38 and 40, respectively. A circular torsion spring 50, as best seen in FIGS. 4 and 5, is mounted within circumferential groove 30 beneath the grip portion 52 of sleeve 32. One end 54 of spring 50 is mounted in an opening 56 in housing 16. The other end 58 of spring 50 terminates in an opening 60 within sleeve 32. Spring 50 serves to bias sleeve 32 toward the first or locked position. Rotation of sleeve 32 in the clockwise direction, as shown in FIG. 1, causes spring 50 to be twisted, thereby exerting a biasing force on sleeve 32 tending to rotate same back to the first position.

When parts A and B are locked together, the flexible locking arms 22, 24 are situated within axially extending recesses 38, 40, respectively, with the lobe portions of each of the locking portions 22b and 24b engaging the shoulders at either side of the respective recesses. Sleeve 32 is biased by spring 50 towards the first rotational position such that locking portions 22b and 24b of the respective locking arms are situated within the nesting section of each of the recesses 46, 48, respectively. This is illustrated in FIG. 4. In this position, the laterally extending lobes on the locking arms cooperate with the shoulders at the end of the respective recesses to prevent disengagement of the parts.

Release of the parts is accomplished by rotating sleeve 32 in a clockwise direction, as seen in FIG. 1, such that the camming sections 46b and 48b of circumferentially extending recesses 46 and 48 cause the locking portions 22b, 24b of locking arms 22, 24 to move radially outwardly with respect to the exterior surface of housing 16. This causes the lobed portions of each of the locking portions, previously engaged by the shoulders on either side of the respective recesses, to be disengaged therefrom. This state is illustrated in FIG. 5. Thus, simple rotation of sleeve 32 causes releasing of the locking mechanism comprising locking arms 22 and 24, thereby permitting separation of the parts, by pulling same apart.

If automatic separation of the parts is desired, a means for separating the parts when the locking mechanism is released may be interposed between the parts. This separating means may take the form of a disc or annular member 62 having one or more openings therein through which pins 14 may extend. Disc or member 62 is interposed between the parts, preferably between locking arms 22, 24 on the interior surface of housing 10 such that same is adjacent surface 34 of housing 16 when the parts are connected. When the parts are pushed together to lock same, member 62 is compressed, exerting an outward separating force between the parts which firmly maintains engagement between the locking portions 22b, 24b and the shoulders at the end of each of the recesses 38, 40. However, when sleeve 32 is rotated to release the locking mechanism, the compressed member 62 expands causing the parts to separate a distance sufficient to prevent the locking arms from re-entering recesses 38 and 40, even after sleeve 32 has been rotated back to its first position by the action of torsion spring 50. Thereafter, complete separation of the parts can be achieved by merely separating same.

As noted above, it is necessary that the locking arms on the first part be flexible to permit insertion of the forward end of the second part therebetween. It is preferable, to reduce manufacturing costs, to mold the first part in a single molding operation with the locking arms integral with the remainder of the housing. However, for certain applications, more strength than can be provided by plastic locking arms may be required. In such instances, locking arms composed of flexible metal, anchored to the remainder of the housing during or after molding thereof, may be utilized.

The connector shown and described above is "opened" in the sense that there is no protective shield extending from the housing of the first part which surrounds the locking arms to enclose the space between the parts when same are connected. In some applications, shielding of this space from humidity, dirt or other environmental influences may be desirable. In such cases, a hollow cylindrical shield member may be molded on and extend from the housing of the first part surrounding the locking arms, except at the locking portions thereof, which must be free to move radially outwardly a short distance to permit locking and release thereof. It is also preferable to permit access to the locking portions of the locking arms to permit manual release thereof, if necessary.

It will now be appreciated that the present invention relates to an axially mating cable connector, wherein connection between and locking of the parts is achieved by a single pushing motion on the part of the operator and, thereby, without the necessity of a secondary motion to lock the parts after same have been pushed together. The release mechanism is actuated by a single simple rotational motion on the part of the operator. Actuation of the release mechanism is achieved in a manner which will substantially reduce the possibility of accidental disconnection of the parts. Both the locking mechanism and the release mechanism are highly compact in nature, thereby adding only a small amount of additional volume to the connector.

The locking mechanism and the releasing mechanism are situated externally of the connector housing such that same are accessible even when the parts are connected. In this manner, the parts may be disconnected manually should either of the mechanisms jam. Both the locking mechanism and the releasing mechanism are of simplified design, function reliably and the connector may be relatively inexpensively manufactured.

While only a single preferred embodiment of the present invention has been disclosed herein for purposes of illustration, it is obvious that many modifications and variations could be made thereto. It is intended to cover all of these variations and modifications which fall within the scope of the invention, as defined by the following claims:

I claim:

1. An axially mating cable connector comprising first and second parts carrying interengageable contact members, means for locking said parts to prevent disengagement of said contact members, and means for releasing said locking means, said locking means comprising a flexible locking arm mounted on and axially extending from said first part and having a lobe thereon, an axially extending recess and a shoulder on a surface of said second part, said arm being adapted to be at least partially received within said recess with said lobe engaging said shoulder to lock said parts, said releasing means comprising an actuating member and a circumferential groove on the exterior surface of said second part into which said actuating member is at least partially received, said actuating member being rotatable about the axis of said second part to engage said arm and move same radially outwardly relative to said surface of said second part to disengage said lobe from said shoulder, means for biasing said actuating member towards a position wherein said member does not operatively engage said arm, said biasing means comprising a torsion spring operably connected between said second part and said actuator member.

2. The connector of claim 1, wherein said spring is situated within said groove under said actuator member.

3. An axially mating cable connector comprising first and second parts carrying interengageable contact members, means for locking said parts to prevent disengagement of said contact members, and means for releasing said locking means, said locking means comprising a flexible locking arm mounted on and axially extending from said first part and having a lobe extending laterally therefrom, a shoulder on a surface of said second part, said arm being adapted to be received adjacent a portion of said surface of said second part with said lobe engaging said shoulder to lock said parts, said releasing means comprising an actuating member mounted on said second part and rotatable about the axis thereof, said actuator member having a recess comprising a nesting section and a camming section and being rotatable between a first position, wherein the portion of said arm from which said lobe extends is situated in said nesting section, and a second position wherein said camming section engages said arm and moves same radially outwardly relative to said exterior surface of said second part to disengage said lobe from said shoulder, said camming section comprising a cam surface situated on the interior surface of said actuator member recess, said cam surface extending along said interior surface of said recess in the direction of movement of said actuator member, and further comprising means for biasing said member towards said first position, said biasing means comprising a torsion spring, operably connected between said second part and said actuatable member.

4. An axially mating cable connector comprising first and second parts carrying interengageable contact members, means for locking said parts to prevent disengagement of said contact members, and means for releasing said locking means, said locking means comprising a flexible locking arm mounted on and axially extending from said first part and having a lobe thereon, a shoulder on the surface of said second part, said arm being adapted to be received adjacent a portion of the surface of said second part with said lobe engaging said shoulder to lock said parts, said releasing means comprising an actuating member mounted onto the second part and rotatable about the axis thereof, said actuator member having a recess thereon comprising a nesting section and a camming section, and being rotatable between a first position wherein the portion of said arm from which said lobe extends is situated in said nesting section, and a second position wherein said camming section engages said arm and moves same radially outwardly relative to said surface of said second part to disengage said lobe from said shoulder, said camming section comprising a cam surface situated on the interior surface of said actuator member recess, said cammed surface extending along said interior surface of said recess in a direction of movement of said actuator member and further comprising means for biasing said actuator member towards a position wherein said member does not operatively engage said arm, said biasing means comprising a torsion spring operably connected between said second part and said rotatable member.

5. An axially mating cable connector comprising first and second parts carrying interengageable contact members, means for locking said parts to prevent disengagement of said contact members, and means for releasing said locking means, said locking means comprising a flexible locking arm mounted on and axially extending from said first part and having a lobe thereon, a shoulder on said surface of said second part, said arm being adapted to be received adjacent the portion of said surface of said second part with said lobe engaging said shoulder to lock said parts, said releasing means comprising an actuating member mounted on said second part and rotatable about the axis thereof to engage said arm and move same radially outwardly relative to said surface of said second part to disengage said lobe from said shoulder, said actuator member having a recess thereon comprising a nesting section and a camming section, and further comprising means for biasing said actuator member towards said first position, said biasing means comprising a torsion spring operatively connected between said second part and said actuator member.

6. An axially mating cable connector comprising first and second parts carrying interengageable contact members, means for locking said parts to prevent disengagement of said contact members, and means for releasing said locking means, said locking means comprising a flexible locking arm mounted on and axially extending from said first part and having a lobe thereon, a shoulder on a surface of said second part, said arm being adapted to be received adjacent a portion of said surface of said second part with said lobe engaging said shoulder to lock said parts, said releasing means comprising an actuating member mounted on said second part and rotatable about the axis thereof to engage said arm and move same radially outwardly relative to said surface of said second part to disengage said lobe from said shoulder, and further comprising means for automatically biasing said parts away from each other, said parts biasing means comprising a compressible element interposed between said parts.

7. The connector of claim 6, wherein said element has an opening therein.

8. An axially mating cable connector comprising first and second parts carrying interengageable contact members, means for locking said parts to prevent disengagement of said contact members, and means for releasing said locking means, said locking means comprising a flexible locking arm mounted on and axially extending from said first part and having a lobe thereon, a shoulder on a surface of said second part, said arm being adapted to be received adjacent a portion of said surface of said second part with said lobe engaging said shoulder to lock said parts, said releasing means comprising an actuating member mounted on said second part and rotatable about the axis thereof to engage said arm and move same radially outwardly relative to said surface of said second part to disengage said lobe from said shoulder, said locking means further comprising a second flexible locking arm having a second lobe thereon, said second arm axially extending from said first part at a position spaced from said first arm and wherein said second part has a second shoulder thereon, a portion of said second part being received between said arms such that said first and second lobes engage said first and second shoulders, respectively, to lock said parts, and further comprising means for automatically biasing said parts away from each other, said parts biasing means comprising a compressible element interposed between said parts.

9. The connector of claim 8, wherein said element has an opening therein.

* * * * *